APPARATUS FOR EXTENDING A MAGNETIC SOUND RECORD SHEET ON A MAGNETIC SOUND RECORD READING MACHINE

Filed April 2, 1958

United States Patent Office 2,926,018

Patented Feb. 23, 1960

2,926,018

APPARATUS FOR EXTENDING A MAGNETIC SOUND RECORD SHEET ON A MAGNETIC SOUND RECORD READING MACHINE

Yasushi Hoshino and Minoru Sato, Tokyo, Japan

Application April 2, 1958, Serial No. 725,898

Claims priority, application Japan April 6, 1957

2 Claims. (Cl. 274—4)

A magnetic sound record sheet used on a magnetic sound record reading machine as described in U.S. patent application Ser. No. 635,335, filed January 22, 1957, has generally a relatively great width, the size being preferably as that of a letter paper sheet. The magnetic sound record sheet has on one surface a magnetic sound recording film and on the other surface descriptions relating to the content of sound record. This sheet is extended under a pressing plate of a magnetic sound record reading machine in recording and reproducing of sound, the magnetic sound recording film being faced downwardly to get contact with magnetic sound recording and reproducing heads of the machine. Under such condition, the magnetic sound record sheet has tendency to suspend downwardly in the middle part since it is not held as the edge of the sheet which is kept in position by a panel plate. If the sheet is slackened, the head below the sheet in scanning operation will cause undulation which may move on the sheet according to the position of a contacting head and affect adversely not only correct scanning of the head but also make it difficult to read the descriptions of the upper surface of the sheet.

The object of this invention is to provide a support for the magnetic sound record sheet and to avoid the occurrence of undulation as described above. According to this invention, the support of the sheet is movable as the heads of the machine move and the magnetic sound record sheet is always kept in good contact with the lower surface of the pressing plate.

According to this invention, the slackening of the sheet as described above will be eliminated and good sound recording and reproducing can be attained. Further, the wear of heads which may be caused rapidly by irregular contact with the magnetic coating film if there is slackening of the sheet may be prevented inasmuch as smooth scanning can be secured. It is also easy to read the descriptions on the upper surface of the sheet since there is no longer any moving undulation and the descriptions are kept standstill on a flat surface.

The features and merits of this invention as described above as well as other features and merits will be more clearly understood as the explanation made with reference to the accompanying drawings will proceed.

Figure 1:
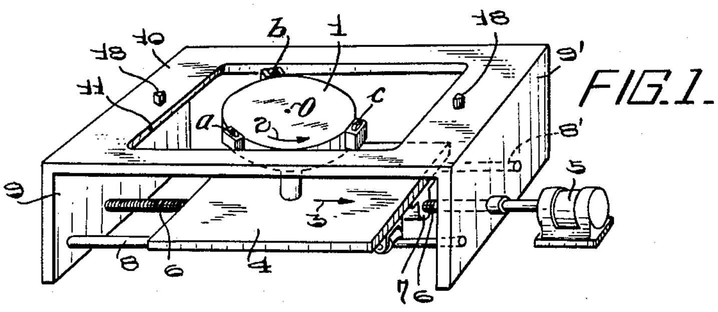
Fig. 1 is a perspective view of a magnetic sound record reading apparatus.

Referring to Fig. 1, a rotary member, for example, a turn table 1 has a plurality of heads *a*, *b* and *c* (in the illustrated embodiment, 3 heads) mounted on the circumference at equal intervals. The turn table 1 rotates around the center O in the direction of the arrow 2 at a constant speed.

Figures 2, 3, 4:
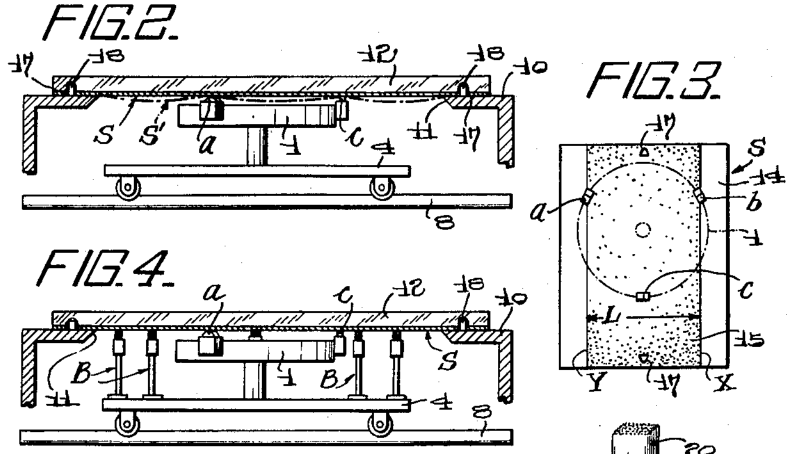
Fig. 2 is a front view of the apparatus of Fig. 1 in sound recording or reproducing operation.
Fig. 3 is a plan view of a magnetic sound record sheet.
Figs. 4–8 are views illustrating some embodiments of the present invention.

The turn table 1, being mounted rotatably on a shifting plate 4, moves while rotating in the direction of the arrow 3 at a constant speed together with the shifting plate 4. The mechanism for rotating the table is not shown in the drawing, since it is not the subject matter of the present invention, but it can be contemplated easily by those skilled in the art. For shifting the plate 4, a motor 5 is provided to rotate a threaded bolt 6. A nut 7 is in meshing with the bolt 6 and the nut 7 is fixed on the shifting plate 4. Accordingly the plate 4 is moved in the direction of the arrow 3 when the bolt 6 is rotated. 8 and 8' are guiding rails for the shifting plate 4 and are supported by end plates 9 and 9' which support also the bolt 6. 10 represents a panel plate which will be explained hereinafter and has a window 11 in the central part. In Fig. 2, a pressing plate 12 is of transparent glass, plastic or like material and has a size sufficiently large to cover the window 11 of the panel plate 10.

Referring to Fig. 3, S represents a magnetic sound record sheet consisting of a paper carrier 14 and a magnetic coating film 15. On the surface opposite to the coating film, descriptions composed of letters, figures and the like are described. The magnetic coating film is demarcated by parallel straight lines X and Y and has a width of L which is equal to the linear distance between the centers of gaps of adjoining heads, that is *a—b*, *b—c* and *c—a*.

The sheet S has guiding holes 17 for setting the magnetic sound record sheet on a determined position on a magnetic sound record reading machine by setting the holes 17 on the pins 18 of said machine as shown in Fig. 1.

Fig. 2 illustrates a longitudinal sectional view of some essential parts of the reading machine on which the magnetic sound record sheet is mounted.

The sheet S is set between the panel plate 10 and the pressing plate 12 in a definite position by means of the setting pins 18 and the guiding holes 17. The sheet is held on the edge by the pressing plate 12 and the panel plate 10 but there is no support in the middle portion excepting heads *a*, *b* and *c* bearing against the sheet to urge it upward. Accordingly the sound record sheet has the tendency to slacken downwardly in the middle portion as shown by S' in Fig. 2 due to gravity and to form undulations in several parts by slackening downwardly. Under such condition, recording and reproducing of sound on the sheet will be naturally affected. Moreover, the reading of the descriptions on the surface of the magnetic sound record sheet will become difficult and disagreeable in comparison with reading of conventional books or literatures, since the descriptions are not on a flat surface and moving.

Figure 6:
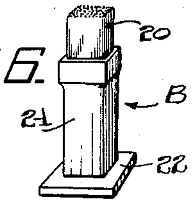

According to the present invention, supporting members B movable together with the rotary member and the shifting plate 4 are provided to avoid the difficulties as described above. The supporting member B comprises as shown in Fig. 6 a brush 20, a supporting post 21 and a base 22. This base 22 is adapted to be fixed on the shifting plate 4 or a turn table 1.

Figure 5:
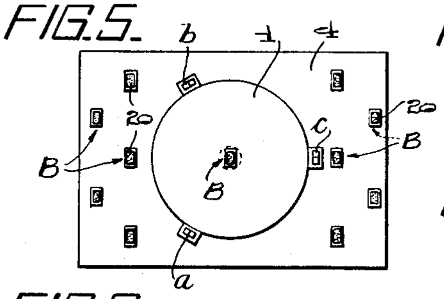

Figs. 4 and 5 illustrate the arrangement of a plurality of the supporting members B on a shifting plate 4 and a turn table. A supporting member B may be provided at any desired position, for instance, at the center O on the surface of the turning table 1 having heads *a*, *b* and *c*. In addition to the supporting member B on the turn table 1, a proper number of the supporting members B may be arranged on the shifting plate 4 as shown in Figs. 4 and 5. The brushes 20 of the supporting members B urge lightly the magnetic sound record sheet upwardly against the pressing plate 12 and consequently undulations which may be caused by gravity can be prevented when a proper number of supporting members B are arranged in proper positions. It is to be noted that the provision of these supporting members do not hinder the rotation of the turn table 1 and the shifting motion of the shifting plate 4 since the friction between the brush 20 and the sheet S is not great.

The provision of the supporting members B will secure the flat positioning of the descriptions on the surface of the magnetic sound record sheet to enable the user of the magnetic sound record reading machine to read the descriptions easily and comfortably, and also secure satisfactory and smooth operation of scanning in recording and reproducing of sound.

Figure 7:
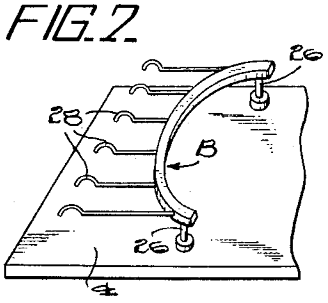

Fig. 7 illustrates another embodiment of a supporting device according to the present invention. The shifting plate 4 has on its surface a supporting member B consisting of an arc-shape member 27 fixed on the surface by supporting posts 26 and a number of springs 28 one end of which is fixed on the arc-shape member 27 and the other end of which is bent in the form of a hook and is adapted to press the sheet S against the pressing plate 12 from below. It is apparent that these springs 28 serve to support the magnetic sound record sheet in a flat position in general and to maintain the sheet in close contact with the pressing plate 12.

Figure 8:
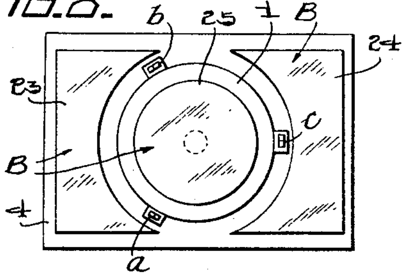

Fig. 8 illustrates still another embodiment of a supporting device of the present invention. The supporting member B of this embodiment has thin plates 23, 24 and 25 of plastic, metal, or the like which are elastically supported on the turn table 1 or the shifting table 4. They press in cooperation the magnetic sound record sheet S from below against a pressing plate 12, and thus the sheet is supported in flat position substantially in the whole surface.

While the mechanism for urging the thin plates 23, 24 and 25 upwardly is not illustrated in the drawing, it may be springs provided on the surface of the turn table 1 and the shifting plate 4. The upwardly pressing forces are adjusted not to be excessive and the rotation of the turn table 1 and the shifting of the plate 4 will not be hindered practically.

What we claim is:

1. In a magnetic sound record reading machine comprising a panel plate having a centrally located window against which a magnetic sound record sheet is set, a turn table including a plurality of recording and reproducing heads, a shifting plate rotatably supporting said table and slidable longitudinally below said sheet to scan the sheet with the heads, and a transparent pressing plate adapted to be placed on the sheet, a device for supporting a magnetic sound record sheet against the pressing plate which comprises an arc-shape member fixed on the shifting plate along a locus defined by a head on the turntable and elastic elements fixed on said arc-shape member and adapted to press the sheet against the pressing plate.

2. A device according to claim 1 in which the elastic elements are elastic hooks fixed on the arc-shape member.

References Cited in the file of this patent

UNITED STATES PATENTS 2,709,597 Stroobants ------------- May 31, 1951